United States Patent
Kramer et al.

(10) Patent No.: US 9,494,109 B2
(45) Date of Patent: *Nov. 15, 2016

(54) PIVOTING BALL STOP FOR EXHAUST DUCT LINER HANGER

(75) Inventors: George J. Kramer, Tolland, CT (US); Stephen K. Kramer, Cromwell, CT (US)

(73) Assignee: United Technologies Corporation, Hartford, CT (US)

(*) Notice: Subject to any disclaimer, the term of this patent is extended or adjusted under 35 U.S.C. 154(b) by 708 days.

This patent is subject to a terminal disclaimer.

(21) Appl. No.: 13/586,627

(22) Filed: Aug. 15, 2012

(65) Prior Publication Data

US 2014/0048166 A1  Feb. 20, 2014

(51) Int. Cl.
*F02K 1/82* (2006.01)

(52) U.S. Cl.
CPC ........... *F02K 1/822* (2013.01); *F05D 2260/30* (2013.01); *Y02T 50/675* (2013.01); *Y10T 29/494* (2015.01)

(58) Field of Classification Search
CPC ............. F23R 3/60; F23R 3/283; F01D 9/023; F02C 7/20; Y02T 50/671; Y02T 50/675; F02K 1/822; F02K 1/80; F02K 1/82; Y10T 29/49323; Y10T 29/4932; Y10T 29/49398; Y10T 29/73264; Y10T 29/494; F05D 2260/30; F05D 2250/25; F05D 2230/642; F05D 2300/5021; F23R 2900/00005
See application file for complete search history.

(56) References Cited

U.S. PATENT DOCUMENTS

| | | | |
|---|---|---|---|
| 3,737,975 A * | 6/1973 | McKinnon, Jr. | ............. 29/421.1 |
| 5,059,055 A | 10/1991 | DeGress et al. | |
| 5,265,409 A | 11/1993 | Smith, Jr. et al. | |
| 7,017,334 B2 * | 3/2006 | Mayer et al. | .................... 60/266 |
| 7,581,399 B2 | 9/2009 | Farah et al. | |
| 7,721,522 B2 | 5/2010 | Farah et al. | |
| 7,788,899 B2 | 9/2010 | Smith | |
| 7,854,586 B2 | 12/2010 | Major et al. | |
| 7,861,535 B2 | 1/2011 | Figueroa et al. | |
| 7,866,158 B2 | 1/2011 | Murphy | |
| 8,127,526 B2 | 3/2012 | Murphy et al. | |
| 2009/0293498 A1 * | 12/2009 | Petty et al. | ...................... 60/796 |
| 2009/0317175 A1 * | 12/2009 | Martinez | ........................ 403/24 |
| 2010/0135770 A1 * | 6/2010 | Durocher et al. | .............. 415/69 |
| 2011/0016880 A1 | 1/2011 | Roberts et al. | |

* cited by examiner

*Primary Examiner* — Ehud Gartenberg
*Assistant Examiner* — Jared W Pike
(74) *Attorney, Agent, or Firm* — Kinney & Lange, P.A.

(57) ABSTRACT

A hanger for suspending a liner within an exhaust duct of a gas turbine engine comprises a bracket, a disk and a rod. The bracket is for connecting to an exhaust duct liner of the gas turbine exhaust system. The disk is slidably engaged with the bracket. The rod is for connecting to an exhaust duct of the gas turbine engine. The rod is pivotably connected to the disk.

23 Claims, 3 Drawing Sheets

PIVOTING BALL STOP FOR EXHAUST DUCT LINER HANGER

CROSS-REFERENCE TO RELATED APPLICATION(S)

The following co-pending application filed on the same day as this application is hereby incorporated by reference: "SPHERICAL BUTTON DISK FOR EXHAUST DUCT LINER HANGER" by inventors G. Kramer and J. Smith, U.S. patent application Ser. No. 13/586,638.

BACKGROUND

This invention relates generally to gas turbine engines and more particularly to exhaust duct liner attachment systems and methods. In gas turbine engines, it is necessary to protect exhaust ducts with an insulating shield in order to prevent heated core gases from damaging the exhaust ducts. Typically, exhaust ducts are made from titanium-based alloys and have temperature limits of approximately 300°-600° F. (~148.9°-315.6° C.). Exhaust gases, however, reach much higher temperatures. It is, therefore, necessary to line exhaust ducts with a material that is capable of withstanding the peak temperatures of the core gases and that prevents the exhaust duct from reaching its temperature limitations. Exhaust duct liners are typically made from nickel-based alloys, which have temperature limits of approximately 700°-1500° F. (~371.1°-815.6° C.). In order to alleviate some of the heat from the exhaust gases imparted to the liner, cooling air is passed between the exhaust duct and liner. For example, bypass air is routed between the duct and liner in turbofan engines. Thus, the exhaust duct and liner are subjected to different pressure and temperature gradients, which results in differing deflections and expansions of each body.

In order to maintain the desired temperature and pressure profile along the exhaust duct and liner, it is desirable to maintain proper spacing between the exhaust duct and liner. The differing pressures, temperatures and functional requirements of the exhaust duct, however, produce three-dimensional forces between the duct and liner, which tend to shift the liner out of alignment. Various designs have been put forth to maintain proper alignment, such as described in U.S. Pat. Nos. 7,581,399 and 7,681,535, which are assigned to United Technologies Corporation. Some of these designs, however, require careful insertion of support members through holes in either the exhaust duct or liner. There is, therefore, a need for an easy to install exhaust duct liner suspension system that maintains proper spacing between an exhaust duct and a duct liner, while also permitting the liner to shift in other directions to accommodate, among other things, thermal growth.

SUMMARY

A hanger for suspending a liner within an exhaust duct of a gas turbine engine comprises a bracket, a disk and a rod. The bracket is for connecting to an exhaust duct liner of the gas turbine exhaust system. The disk is slidably engaged with the bracket. The rod is for connecting to an exhaust duct of the gas turbine engine. The rod is pivotably connected to the disk.

DETAILED DESCRIPTION

Figure 1:
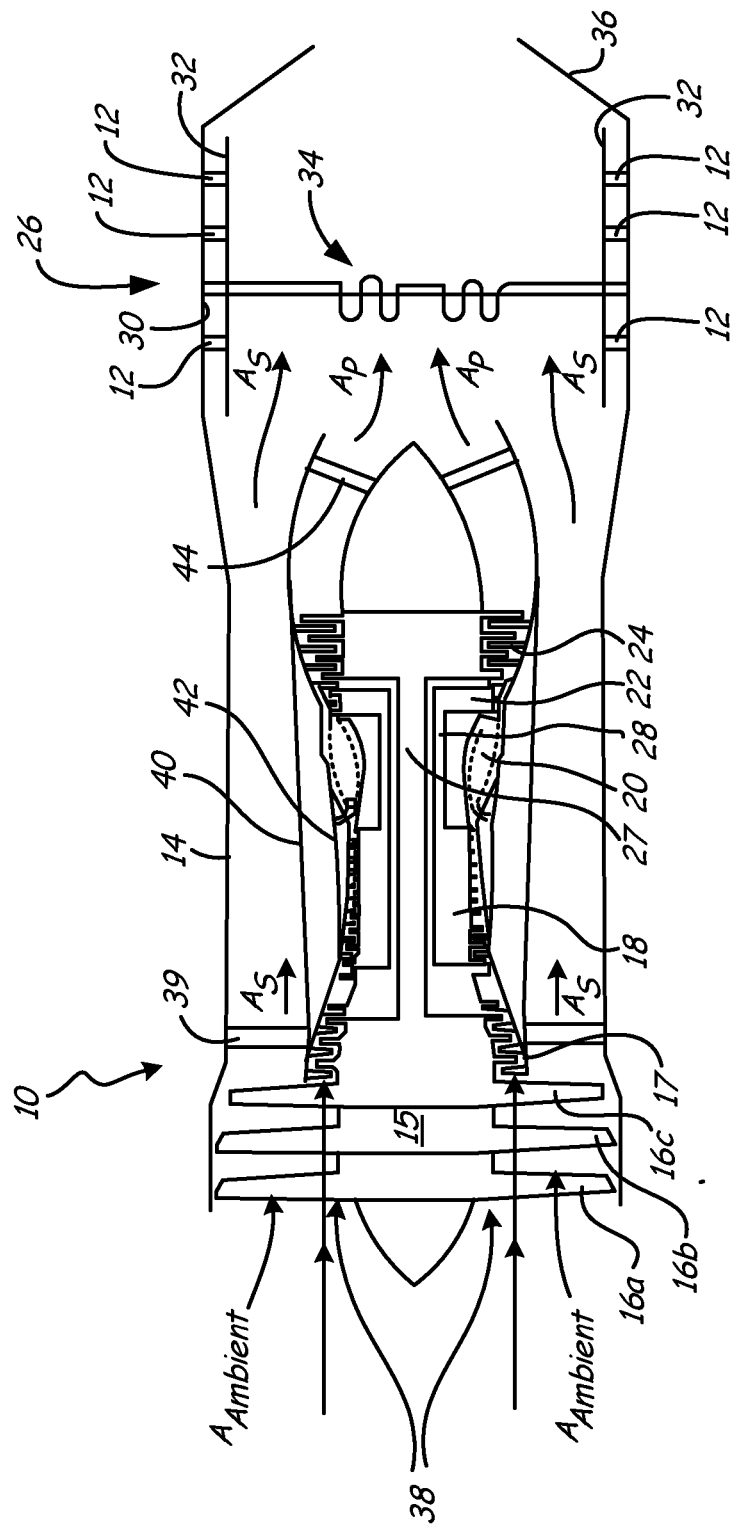
FIG. 1 is a schematic diagram of a dual-spool, low-bypass ratio turbofan engine having an exhaust duct liner supported within an exhaust duct using hangers having pivoting ball stops of the present invention.

FIG. 1 shows a schematic diagram of dual-spool, low-bypass ratio turbofan engine 10, in which hangers 12 of the present invention can be used. Although, in other embodiments, the present invention is applicable to other types of gas turbine engines such as high-bypass ratio turbofans including turbofans using fan drive gear systems. Turbofan engine 10 also includes fan duct 14, drive fan 15 (including stages 16a-16c), low pressure compressor 17, high pressure compressor 18, combustor 20, high pressure turbine 22, low pressure turbine 24 and exhaust system 26. Drive fan 15 and low pressure compressor 17 are driven by low pressure turbine 24 with shaft 27. High pressure compressor 18 is driven by high pressure turbine 22 with shaft 28. High pressure compressor 18, combustor 20, high pressure turbine 22 and shaft 28 comprise the core of turbofan engine 10, which produces the high energy air stream that is ultimately used to drive low pressure turbine 24 and provide high pressure flow to produce thrust via both primary air $A_P$ and secondary air $A_S$. Exhaust system 26 includes exhaust duct 30, liner 32, augmentation system 34 and exhaust nozzle 36. Exhaust system 26 also includes hangers 12, which include pivoting ball stops of the present invention. Hangers 12 are disposed in multiple circumferential arrays to maintain liner 32 mounted within exhaust duct 30. FIG. 1 shows three, axial sequential arrays of hangers 12. However, liner 32 may be supported by many more arrays wherein the total number of hangers numbers in the hundreds.

Ambient air $A_{Ambient}$ enters engine 10 at inlet 38 through drive fan 15. Drive fan 15 is rotated by low pressure turbine 24 to accelerate ambient air $A_{Ambient}$ thereby producing a major portion of the thrust output of engine 10. Accelerated ambient air $A_{Ambient}$ is divided into two streams of air: primary air $A_P$ and secondary air $A_S$. Secondary air $A_S$, also known as bypass air, passes through fan exit guide vanes 39 and between fan duct 14 and aft duct 40 where it passes on to exhaust system 26. Thus, the principal function of secondary air $A_S$ is the production of thrust from drive fan 15. Secondary air $A_S$ also serves to cool exhaust duct liner 32 from primary air $A_P$. Primary air $A_P$, also known as hot air, is a stream of air that is directed first into low pressure compressor 17 and then into high pressure compressor 18 within engine case 42. Pressurized primary air $A_P$ is then passed into combustor 20 where it is mixed with a fuel supply and ignited to produce high energy gases, as is known in the art. The high energy gasses are used to turn high pressure turbine 22 and low pressure turbine 24. Turbine 22 drives compressor 18 with shaft 28, while turbine 24 drives compressor 17 and drive fan 15 with shaft 27. Primary air $A_P$ passes from engine case 42 to exhaust system 26 through exit guide vanes 44.

Mixed combusted primary air $A_P$ and bypassed secondary air $A_S$ are passed into exhaust duct 30 of exhaust system 26. As is known in the art, a secondary combustion process can be carried out using augmentation system 34 within liner 32.

The augmentation process elevates the speed and temperature of the mixed exhaust gas to further produce thrust using exhaust nozzle 36. Liner 32, which is suspended from exhaust duct 30 with hangers 12, prevents overheating of duct 30 from the secondary combustion process. Hangers 12 allow liner 32 to shift within exhaust duct 30 to accommodate different thermal expansion rates between liner 32 and duct 30, while accommodating different temperature gradients throughout exhaust system 26. Hangers 12 incorporate pivoting ball stops that permit radial, circumferential and axial displacement of liner 32 within duct 30 without inducing additional stress. The pivoting ball stops of hangers 12 also facilitate expedient assembly of liner 32 within exhaust duct 30.

Figure 2:
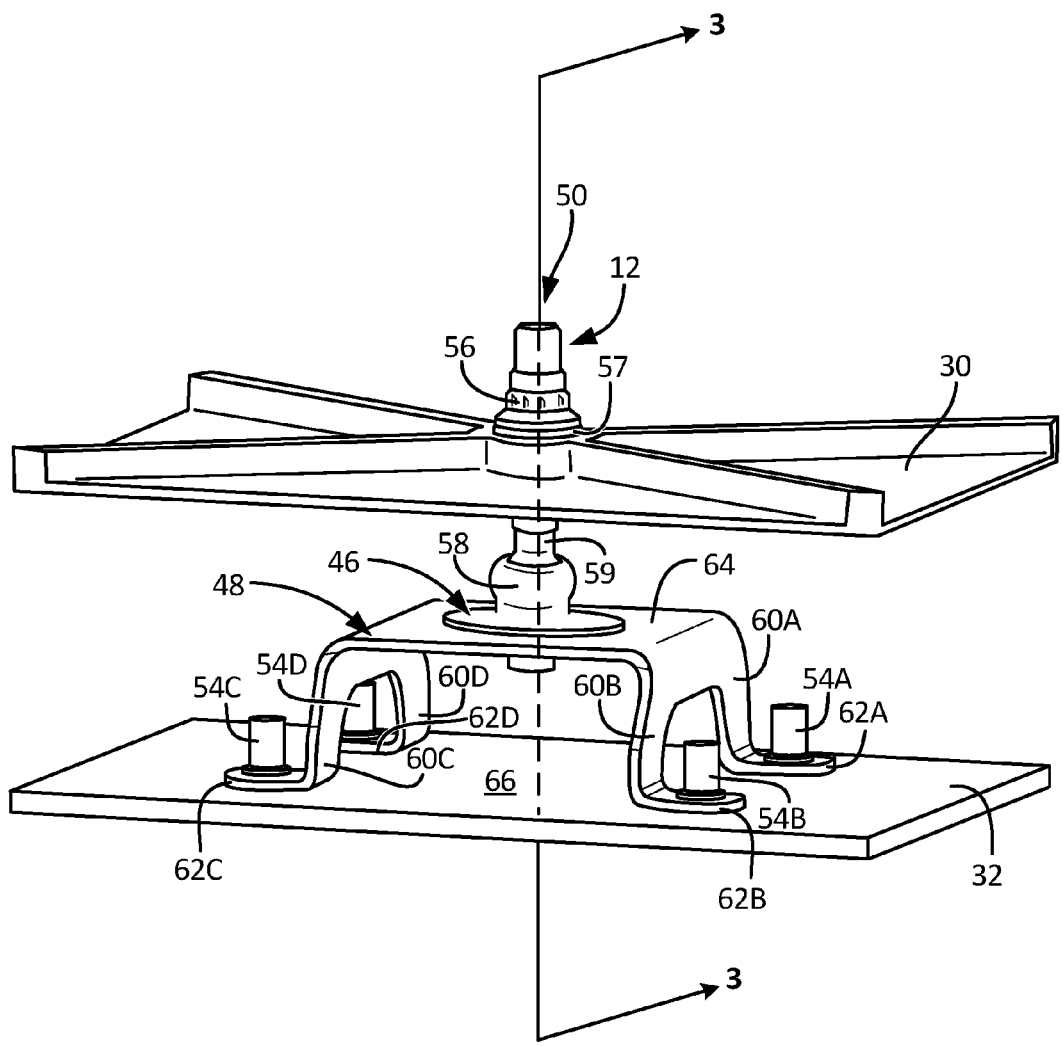
FIG. 2 is a perspective view of a hanger having a pivoting ball stop of the present invention connecting a cut-away portion of an exhaust duct with a cut-away portion of an exhaust duct liner.

FIG. 2 is a perspective view of hanger 12 of FIG. 1 having pivoting ball stop 46. As illustrated, hanger 12 connects a cut-away portion of exhaust duct 30 with a cut-away portion of liner 32. Hanger 12 also includes bracket 48 and retainer rod 50. Bracket 48 is coupled to liner 32 by studs 54A-54D. Retainer rod 50 is coupled to exhaust duct 30 by nut 56 and insert 57. Pivoting ball stop 46 is adjacent a bore extending through bracket 48. Pivoting ball stop 46 includes collar 58 which is fitted over spherical button 59 on retainer rod 50 to join exhaust duct 30 with liner 32 in a rotatable fashion.

Bracket 48 provides a body for rigidly joining to liner 32 and pivoting ball stop 46. Bracket 48 comprises a sheet metal piece that is cut and bent into an elevated-platform shape having legs 60A-60D, feet 62A-62D and platform 64. Legs 60A-60D and feet 62A-62D are bent at various angles to elevate or space platform 64 from liner 32. Each of legs 60A-60D and each of feet 62A-62D can be, respectively, bent at the same or different angles, depending on the shape, contour and surface geometry of liner 32. In the disclosed embodiment, legs 60A-60D are bent generally perpendicular to platform 64 to provide height to bracket 48. Feet 62A-62D are bent generally perpendicular to legs 60A-60D so as to be generally parallel to platform 64. Feet 62A-62D include bores (not shown) for receiving studs 54A-54D, respectively. Studs 54A-54D are joined to outer diameter surface 66 of liner 32 so as to not interfere with flow of primary air $A_P$ (FIG. 1) within liner 32. For example, studs 54A-54D can be welded to surface 66. Bracket 48 provides spacing of platform 64 from liner 32 so as to accommodate assembly of pivoting ball stop 46. Bracket 48 is pre-assembled with liner 32 before liner 32 is assembled with exhaust duct 30. Bracket 48 can be made using a numerically controlled break machine, thereby eliminating the need for expensive form tooling.

Retainer rod 50 rigidly joins exhaust duct 30 to pivoting ball stop 46. Retainer rod 50 and pivoting ball stop 46 are pre-assembled to each other as a sub-assembly. The sub-assembly is then pre-assembled with exhaust duct 30 before liner 32 is assembled with exhaust duct 30. Retainer rod 50 is positioned within the interior of exhaust duct 30 and inserted into an opening in exhaust duct 30 that includes insert 57. Specifically, retainer rod 50 is threaded into insert 57 until pivoting ball stop 46 is in close proximity to exhaust duct 30. Nut 56 is threaded onto the portion of retainer rod 50 extending to the exterior of exhaust duct 30. After liner 32 and bracket 48 are inserted into exhaust duct 30, retainer rod 50 is threaded into insert 57 until pivoting ball stop 46 engages platform 64. Nut 56 is then tightened to secure retainer rod 50 in place. As will be discussed in greater detail later, retainer rod 50 is able to rotate and pivot on spherical button 59 to permit deformation of liner 32 due to, among other things, build tolerances within exhaust duct 30. The deformations also produce local axial and circumferential displacement between exhaust duct 30 and liner 32. Pivoting ball stop 46 is able to axially and circumferentially slide along platform 64, thereby allowing liner 32 to move axially and circumferentially with respect to exhaust duct 30. As such, hanger 12 does not induce axial and circumferential strain within liner 32 during deformation and displacement.

Figure 3:
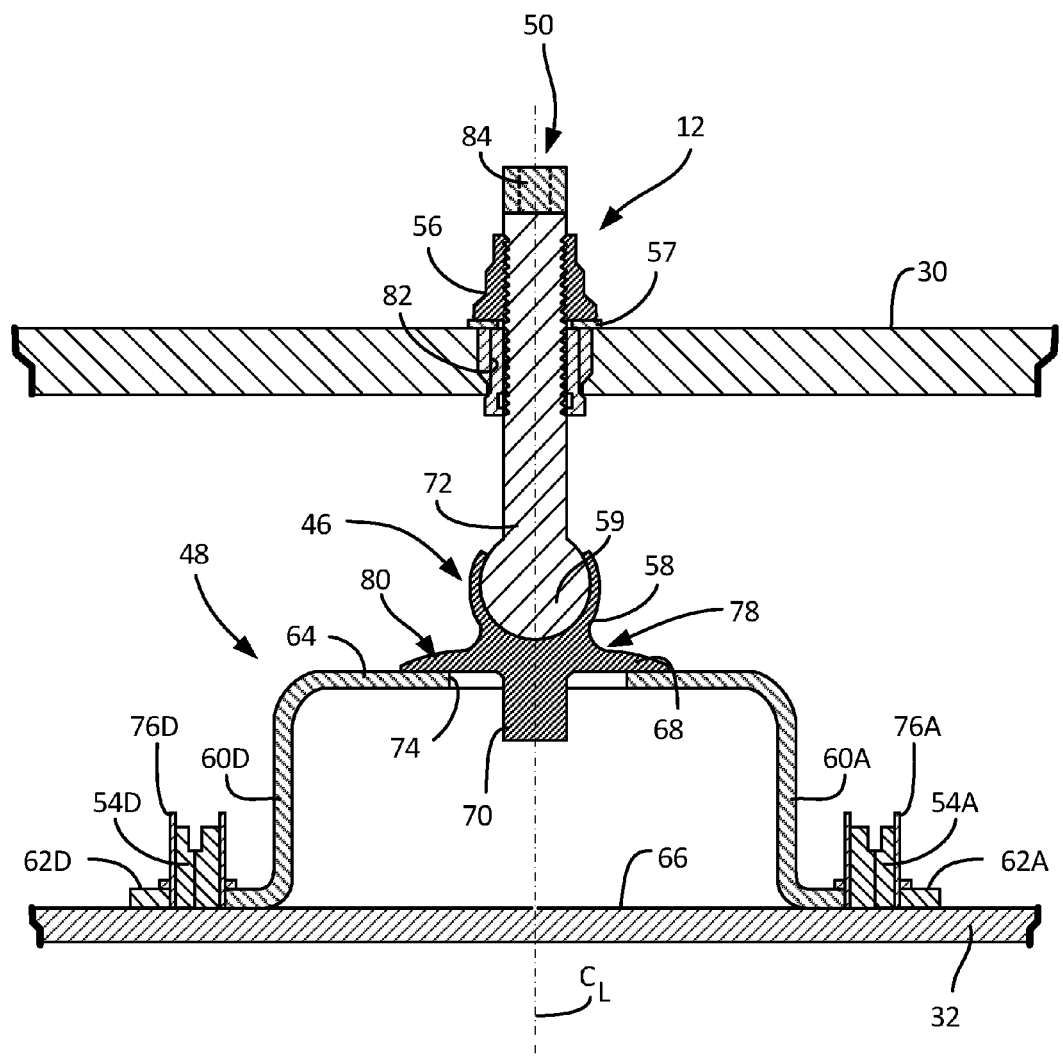
FIG. 3 is a side cross-sectional view of the hanger of FIG. 2 taken along line 3-3 showing a pivoting ball stop of the present invention forming a butt joint and a ball joint between a bracket and a rod.

FIG. 3 is a side cross-sectional view of hanger 12 showing spherical button 59 of pivoting ball stop 46 connected to collar 58 of retainer rod 50. Pivoting ball stop 46 includes collar 58, disk 68 and post 70. Retainer rod 50 includes spherical button 59 and shaft 72. Platform 64 of bracket 48 includes slide bore 74. Studs 54A and 54D include collars 76A and 76D. Spherical button 59 and collar 58 form ball joint 78, while disk 68 and platform 64 form end stop 80.

As discussed above, studs 54A and 54D are joined to liner 32 so as to extend radially outward from outer surface 66. Studs 54A and 54D pass through bores (not shown) in feet 62A and 62D, respectively. Studs 54A and 54D include collars 76A and 76D that maintain feet 62A and 62D engaged with surface 66, thereby preventing bracket 48 from slipping off of studs 54A and 54D. Bracket 48 is pre-assembled with liner 32 before liner 32 is assembled to exhaust duct 30.

Pivoting ball stop 46 and retainer rod 50 are pre-assembled before being joined to exhaust duct 30. Specifically, spherical button 59 is inserted into collar 58, which comprises a cup or socket having an inverse spherical interior shape. Collar 58 is then swaged onto spherical button 59. As such, spherical button 59 is free to rotate within collar 58, but cannot be removed from collar 58. Subsequently, shaft 72 of retainer rod 50 is threaded into insert 57. Insert 57 is inserted through bore 82 in exhaust duct 30 and provides threads into which mating threads on shaft 72 can be engaged. Insert 57 is removable and replaceable from exhaust duct 30 so as to avoid stressing and repairing of exhaust duct 30. Before liner 32 is inserted into exhaust duct 30, shaft 72 is threaded into insert 57 until spherical button 59 is in close proximity to or engages insert 57. Nut 56 is threaded onto the portion of shaft 72 extending radially outward of bore 82 for storage. For example, nut 56 is only threaded as far onto shaft 72 so as to expose torque feature 84. Shaft 72 includes torque feature 84 that facilitates attachment of a torque tool, such as a wrench, so that rotational force can be applied to retainer rod 50. In various embodiments, torque feature 84 may comprise a pair of parallel slab sides or a hex feature.

After liner 32 and bracket 48 are inserted into exhaust duct 30, retainer rod 50 is unthreaded from insert 57 so that spherical button 59 retreats away from insert 57. Specifically, a torque tool can be applied to torque feature 84 externally from exhaust duct 30 after shaft 72 is inserted through bore 82. Shaft 72 is rotated until disk 68 engages platform 64 of bracket 48. Nut 56 is threaded down shaft 72 to engage exhaust duct 30 and prevent rod 50 from unthreading from insert 57. In one embodiment, nut 56 is a self-locking nut, while insert 57 is non-locking. However, in other embodiments, nut 56 can be self-locking or non-locking and insert 57 can be self-locking or non-locking. Platform 64 includes slide bore 74 against which disk 68 abuts. Post 70 is inserted into slide bore 74 so that disk 68 is adjacent platform 64. Post 70 remains positioned inside slide bore 74 so long as sufficient pressure is maintained inside exhaust duct liner 32. As such, shaft 72 reacts radial compressive loading. Disk 68 is, however, free to separate from platform 64 if pressure between duct 30 and liner 32 exceeds the pressure within liner 32. Thus, shaft 72 of hanger 12 does not react radial tensile loading. Instead, radial tensile loading that would generate separation of liner 32 from exhaust duct 30 is reacted by a hanger disposed within duct 30 circumferentially opposite liner 12 depicted in FIG. 3. Post 70 prevents misalignment of shaft 72 in the event disk 68 does separate from platform 64. Post 70 ensures that pivoting ball stop 46 rejoins platform 64 and is thus long enough to encompass any expected separation of disk 68 from platform 64. Slide bore 74 is larger in diameter, or wider as shown in FIG. 3, than post 70. As such, pivoting ball stop 46 is free to slide along platform 64, while post 70 moves within slide bore 74. The diameter of slide bore 74, which limits movement of spherical button 59 by engaging post 70, is determined based on design needs and can be enlarged or reduced to enhance or limit relative movement as needed.

Engagement of pivoting ball stop 46 with platform 64 does not require that bracket 48 be precisely aligned with bore 82 in exhaust duct 30. The gap between post 70 and slide bore 74 within end stop 80 allows for some misalignment. End stop 80 permits movement of disk 68 relative to bracket 48. Ball joint 78 permits rotation of pivoting ball stop 46 to allow disk 68 to flushly engage platform 64 even with axial and circumferential misalignment between bore 82 and slide bore 74. Also, variations in the radial distance between liner 32 and exhaust duct 30 can be accommodated by the threading of retainer rod 50 into insert 57. Specifically, shaft 72 can be threaded into insert 57 to accommodate the full tolerance range of the desired distance between liner 32 and exhaust duct 30. Thus, the use of shims is eliminated as has been required of prior art designs. Further, assembly of pivoting ball stop 46 with bracket 48 does not require the axial insertion of any tools or rigging in the small space between exhaust duct 30 and liner 32 to assemble hanger 12.

During operation of turbofan engine 10 (FIG. 1), various temperature gradients within exhaust system 26 (FIG. 1), produce local stresses and strains within liner 32. Liner 32 is thereby subject to local distortions and displacements. End stop 80 and ball joint 78 of the present invention prevent additional stress and strain from hanger 12 from being induced in liner 32. However, end stop 80 and ball joint 78 also permit hanger 12 to absorb radial compressive loading, such as when liner 32 moves toward duct 30. As liner 32 tends to deform from loading and thermal gradients, hangers 12 distributed circumferentially around liner 32 allow exhaust duct 30 to react those loads to maintain the shape of liner 32 without hangers 12 inducing their own strain into liner 32. For example, as liner 32 rotates and shifts with reference to duct 30 in FIG. 3, the clearance between pivoting ball stop 46 and bracket 48 allows axial and circumferential slippage. End stop 80 permits circumferential movement as discussed above. Retainer rod 50 neither pulls nor pushes on liner 32 to accommodate such movement due to end stop 80. However, disk 68 of pivoting ball stop 46 will maintain radial spacing between exhaust duct 30 and liner 32 for compressive stress situations where liner 32 tends to deform radially outward toward exhaust duct 30, thereby retaining the shape of liner 32 and optimal performance. Pivoting ball stop 46 is thus particularly well suited for use in exhaust system having circular exhaust ducts and circular liners.

Hanger 12 is a simple to use system that facilitates easy installation. With the present invention, the use of tools or rigging to assemble retainer rod 50 is not required. Pivoting ball stop 46 only requires one ball joint, thereby reducing the weight and complexity and number of parts as compared to prior art designs. Nut 56 and bracket 48 require only a small footprint on exhaust duct 30 and liner 32, thereby enabling the use of a greater quantity of hangers 12 if desired. Further, disk 68 decouples rigid connection between exhaust duct 30 and bracket 48 thereby providing a damping function. For example, the introduction of one or more degrees of freedom in movement between bracket 48 and disk 68 reduces the likelihood of hanger 12 vibrating at resonance.

The following are non-exclusive descriptions of possible embodiments of the present invention.

A hanger for use in a gas turbine engine exhaust system comprises a bracket for connection to an exhaust duct liner of the gas turbine exhaust system; a rod for connection to an exhaust duct of the gas turbine engine; and a disk slidably engaged with the bracket and pivotably connected to the rod.

The hanger of the preceding paragraph can optionally include, additionally and/or alternatively, any one or more of the following features, configurations and/or additional components:

A hanger comprising: a platform; and a slide bore extending through the platform.

A hanger comprising: a plurality of legs extending from the platform; and a plurality of feet spaced from the platform by the plurality of legs.

A hanger wherein the disk is positioned adjacent a first side of the platform, and the disk includes a post extending through the slide bore.

A hanger wherein the slide bore has a diameter larger than that of the post to permit relative movement between the disk and bracket.

A hanger wherein: the rod includes a radially inwardly extending ball; and the disk includes a radially outwardly extending spherical cup that receives the ball.

A hanger wherein the rod further comprises a torque feature for receiving a tool that facilitates rotation of the rod.

A hanger wherein the cup is swaged onto the ball.

A hanger further comprising: a threaded insert into which the rod is threaded; and a self-locking nut threaded onto the rod.

A hanger further comprising: a gas turbine engine exhaust duct joined to the rod; and a liner joined to the bracket.

A suspension system comprises: an exhaust duct of a gas turbine engine; an exhaust duct liner disposed within the exhaust duct; a rod comprising: a first end having a threaded shaft joined to the exhaust duct; and a second end opposite the first end and having a ball; a disk having a socket into which the ball is inserted; and a bracket joined to the exhaust duct liner, the bracket having a platform disposed adjacent the disk.

The suspension system of the preceding paragraph can optionally include, additionally and/or alternatively, any one or more of the following features, configurations and/or additional components:

A suspension system wherein the bracket comprises: a plurality of legs extending from the platform; and a plurality of feet spaced from the platform by the plurality of legs, the feet being coupled to the liner.

A suspension system wherein: the platform of the bracket includes a slide bore; and the disk includes a post extending through the slide bore; wherein the slide bore has a diameter larger than that of the post to permit relative movement between the disk and bracket.

A suspension system wherein: the rod includes a radially inwardly extending ball; and the disk includes a radially outwardly extending cup that receives the ball; wherein the cup is swaged onto the ball.

A suspension system wherein the rod further comprises: a torque feature for receiving a tool that facilitates rotation of the rod.

A suspension system wherein the liner pushes the rod into compression with the exhaust duct.

A suspension system further comprising: a threaded insert disposed in a bore in the exhaust duct and into which the rod is threaded; and a self-locking nut threaded onto the rod.

A method for assembling an exhaust duct liner within an exhaust duct of a gas turbine engine comprises: joining a first end of a rod to an exhaust duct, the rod having a second end attached to a disk at a ball joint; inserting an exhaust duct liner into the exhaust duct; and extending the rod from the exhaust duct until the disk engages the exhaust duct liner.

The method of the preceding paragraph can optionally include, additionally and/or alternatively, any one or more of the following features, configurations, steps and/or additional components:

A method further comprising: threading the rod into the exhaust duct; and tightening a nut onto the first end of the rod to immobilize the rod.

A method further comprising: coupling a bracket having a platform to studs of an exhaust duct liner; and extending the rod into the exhaust duct to engage the disk with the platform.

A method further comprising: inserting a post extending from the disk into a slide bore in the platform.

An exhaust duct liner suspension system comprises: a rod comprising: a shaft extending between a first end and a second end; and a ball connected to the second end; and a disk having a socket into which the ball is inserted.

The exhaust duct liner suspension system of the preceding paragraph can optionally include, additionally and/or alternatively, any one or more of the following features, configurations and/or additional components:

An exhaust duct liner suspension system wherein the rod further comprises: a torque feature disposed at the first end; and threads disposed along the shaft.

An exhaust duct liner suspension system wherein the disk further comprises: a post extending opposite the socket.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hanger for use in a gas turbine engine exhaust system, the hanger comprising:
    a bracket for connection to an exhaust duct liner of the gas turbine exhaust system;
    a rod having a first end for connection to an exhaust duct of the gas turbine engine and a second end;
    a disk pivotably connected to the rod at the second end and slidably engaged with the bracket such that a compressive force is transmitted from the bracket to the disk and tensile forces from the bracket are decoupled from the disk and the rod; and
    a post extending from the disk and engaging the bracket to prevent misalignment of the disk from the bracket, wherein the post has a length that is greater than an expected radial displacement of the bracket relative to the disk.

2. The hanger of claim 1 wherein the bracket comprises:
    a platform; and
    a slide bore extending through the platform.

3. The hanger of claim 2 wherein the bracket further comprises:
    a plurality of legs extending from the platform; and
    a plurality of feet spaced from the platform by the plurality of legs.

4. The hanger of claim 2 wherein the disk is positioned adjacent a first side of the platform, and wherein the post extends through the slide bore.

5. The hanger of claim 4 wherein the slide bore has a diameter larger than that of the post to permit relative movement between the disk and bracket.

6. The hanger of claim 4 wherein:
    the rod includes a radially inwardly extending ball; and
    the disk includes a radially outwardly extending spherical cup that receives the ball.

7. The hanger of claim 6 wherein the rod further comprises a torque feature for receiving a tool that facilitates rotation of the rod.

8. The hanger of claim 6 wherein the cup is swaged onto the ball.

9. The hanger of claim 1 and further comprising:
    a threaded insert into which the rod is threaded; and
    a self-locking nut threaded onto the rod.

10. The hanger of claim 1 and further comprising:
    a gas turbine engine exhaust duct joined to the rod; and
    a liner joined to the bracket.

11. The hanger of claim 1, wherein the first and is fixed such that lateral translations of the first end of the rod are restrained and translations of the second end of the rod relative to the first end of the rod are rotationally restrained at the first and of the rod.

12. A suspension system comprising:
    an exhaust duct of a gas turbine engine;
    an exhaust duct liner disposed within the exhaust duct;
    a rod comprising:
        a first end having a threaded shaft joined to the exhaust duct; and
        a second end opposite the first end and having a ball;
    a disk having a socket into which the ball is inserted and a mating surface opposite the socket;
    a bracket joined to the exhaust duct liner, the bracket having a platform disposed adjacent the disk and slide bore extending through the platform, wherein the platform slidably engages the mating surface of the disk such that a compressive force is transmitted from the bracket to the disk and tensile forces from the bracket are decoupled from the disk and the rod; and
    a post extending from the mating surface of the disk and extending through and engaging the slide bore to prevent misalignment of the disk from the bracket, wherein the post has a length that is greater than an expected radial displacement of the bracket relative to the disk.

13. The suspension system of claim 12 wherein the bracket comprises:
    a plurality of legs extending from the platform; and
    a plurality of feet spaced from the platform by the plurality of legs, the feet being coupled to the exhaust duct liner.

14. The suspension system of claim 12 wherein the slide bore has a diameter larger than that of the post to permit relative movement between the disk and bracket.

15. The suspension system of claim 12 wherein:
the rod includes a radially inwardly extending ball; and
the disk includes a radially outwardly extending cup that receives the ball;
wherein the cup is swaged onto the ball.

16. The suspension system of claim 12 wherein the rod further comprises:
a torque feature for receiving a tool that facilitates rotation of the rod.

17. The suspension system of claim 12 wherein the liner pushes the rod into compression with the exhaust duct.

18. The suspension system of claim 12 and further comprising:
a threaded inset disposed in a bore in the exhaust duct and into which the rod is threaded; and
a self-locking nut threaded onto the rod.

19. A method for assembling an exhaust duct liner within an exhaust duct of a gas turbine engine, the method comprising:
joining a first end of a rod to an exhaust duct, the rod having a second end attached to a disk at a ball joint;
inserting an exhaust duct liner into the exhaust duct;
coupling a bracket to studs of an exhaust duct liner, wherein the bracket has a platform spaced from the exhaust duct liner and a slide bore extending through the platform;
extending the rod from the exhaust duct until a mating surface of the disk engages the platform; and
inserting a post extending from the mating surface of the disk into the slide bore in the platform, wherein a length of the post is greater than an expected radial displacement of the bracket relative to the disk.

20. The method of claim 19 and further comprising:
threading the rod into the exhaust duct; and
tightening a nut onto the first end of the rod to immobilize the rod.

21. The method of claim 19, wherein joining the first end of the rod to the exhaust duct comprises:
fixing the first and with respect to the exhaust duct such that lateral translations of the first end of the rod relative to the exhaust duct are restrained and translations of the second and of the rod relative to the first end of the rod are rotationally restrained at the first end of the rod.

22. An exhaust duct liner suspension system comprising:
a rod comprising:
a shaft extending between a first end and a second end;
a torque feature disposed at the first end;
a ball connected to the second end; and
threads disposed along the shaft; and
a disk having a socket into which the ball is inserted, a mating surface opposite the socket, and a post extending from the mating surface, wherein the disk slidably engages a first component such that a compressive force is transmitted from the first component to the disk and tensile forces from the first component are decoupled from the disk and the shaft, and wherein the post prevents misalignment of the first component and the disk, and wherein a length of the post is greater than an expected radial displacement of the first component relative to the disk.

23. The exhaust duct liner suspension system of claim 22, wherein the first end of the shaft is configured to be connected to a second component such that lateral translations of the first end of the shaft with respect to the second component are restrained and translations of the second end of the shaft relative to the first end of the shaft are rotationally restrained by connecting the first end of shaft to the second component.

* * * * *

UNITED STATES PATENT AND TRADEMARK OFFICE
CERTIFICATE OF CORRECTION

PATENT NO. : 9,494,109 B2  Page 1 of 1
APPLICATION NO. : 13/586627
DATED : November 15, 2016
INVENTOR(S) : George J. Kramer et al.

It is certified that error appears in the above-identified patent and that said Letters Patent is hereby corrected as shown below:

In the Claims

Column 8, Line 32:
    Delete "first and"
    Insert --first end--

Column 8, Line 36:
    Delete "first and"
    Insert --first end--

Column 9, Line 14:
    Delete "inset"
    Insert --insert--

Column 10, Line 3:
    Delete "first and"
    Insert --first end--

Column 10, Line 6:
    Delete "second and"
    Insert --second end--

Signed and Sealed this
Tenth Day of January, 2017

Michelle K. Lee
*Director of the United States Patent and Trademark Office*